United States Patent
Sutter et al.

[11] Patent Number: 5,120,585
[45] Date of Patent: Jun. 9, 1992

[54] PACKAGE FOR PRESERVATIVE AGENT

[75] Inventors: Mark Sutter, Ypsilanti, Mich.; Yitzchak Kenigsberg, Petah Tikvah; Ehud Shchori, Rehovot, both of Israel

[73] Assignee: Gelman Sciences Technology, Inc., Ann Arbor, Mich.

[21] Appl. No.: 596,530

[22] Filed: Oct. 12, 1990

[51] Int. Cl.[5] ............................................. B32B 21/06
[52] U.S. Cl. .................................. 428/34.2; 428/131; 428/142; 428/34.3; 428/36.1; 428/36.5; 206/484.1; 206/524.3; 206/524.4; 383/102; 383/105
[58] Field of Search ...................... 428/137, 34.2, 34.3, 428/36.1, 36.5, 131, 142; 206/204, 484.1, 524.3, 524.4; 383/102, 105

[56] References Cited

U.S. PATENT DOCUMENTS

| | | | |
|---|---|---|---|
| 4,332,845 | 6/1982 | Nawata et al. | 428/35 |
| 4,421,235 | 12/1983 | Moriya | 206/524 |
| 4,537,815 | 8/1985 | Wise et al. | 428/219 |
| 4,579,223 | 4/1986 | Otsuka et al. | 206/204 |
| 4,657,133 | 4/1987 | Komatsu et al. | 206/204 |
| 4,667,814 | 5/1987 | Wakamatsu et al. | 206/0.7 |
| 4,769,175 | 9/1988 | Inoue | 252/188.28 |
| 4,856,649 | 8/1989 | Inoue | 206/204 |
| 4,856,650 | 8/1989 | Inoue | 206/204 |

OTHER PUBLICATIONS

Product Literature from Mitsubishi Gas Chemical Co.
Product Literature from DuPont Co.

Primary Examiner—James J. Seidleck
Assistant Examiner—Charles R. Nold
Attorney, Agent, or Firm—Krass & Young

[57] ABSTRACT

A gas permeable package for a preservative agent is fabricated from a material which includes a support having pores therein sufficiently large to permit passage of gas therethrough but small enough to retain a preservative agent. There is a conformal, hydrophobic and oleophobic coating on the porous support member. The coating includes a fluoroacrylate based polymer.

14 Claims, 1 Drawing Sheet

PACKAGE FOR PRESERVATIVE AGENT

FIELD OF THE INVENTION

This invention relates generally to packaging and more specifically to a gas-permeable, water and oil repellant package for retaining a preservative agent, particularly a food preserving agent.

BACKGROUND OF THE INVENTION

The preservation of food is important for commercial as well as health reasons. An increase in the shelf life of food products simplifies delivery and handling systems and increases profit for the producer and quality for the consumer. Various synthetic additives have long been employed to preserve, or otherwise increase the shelf life of food products.

Chemical additives in foods are subject to ever increasing regulation and many additives which were previously permitted to be used in foods are now restricted. Furthermore, the consumer demand for additive-free food is steadily increasing. As a result of the foregoing, there is a significant and rapidly growing demand for methods and means for the preservation of food products, which do not rely upon the introduction of any additives into those food products.

One significant approach to the problem of food preservation relies upon the use of preservative agents which are disposed in the food package separate from the food product itself. Toward this end it is known to include preservative agents such as oxygen scavengers, desiccants, odor absorbents, carbon dioxide scavengers, or biocides in a permeable package which is disposed within the food container. The preservative agent acts to create an atmosphere which is conducive to increased shelf life of the food. For example, it is known to seal oxygen absorbing materials, such as iron compounds, into oxygen permeable packages and to include such packages in sealed food containers. Presence of the package of oxygen scavenging material creates a very low oxygen atmosphere in the food container thereby greatly retarding spoilage of the food. Preservative compositions and packages for those compositions are disclosed in U.S. Pat. Nos. 4,421,235; 4,332,845; 4,579,223; 4,657,133; 4,667,814; 4,769,175 and 4,856,649.

In order to function properly, the package containing the preservative agent must be sufficiently porous to allow atmospheric gases to pass therethrough, but at the same time must be of a porosity sufficiently fine so as to retain the preservative agent therein. One problem which significantly inhibits the function of additive packages of this type is the clogging of the pores by oil, grease or water present in the food products. Such materials can form an adherent layer upon the package which presents an effective barrier to contact between the preservative agent and the gaseous atmosphere in the food container.

One approach to the problem is disclosed in U.S. Pat. No. 4,856,650. Detailed therein is a process whereby an air permeable sheet is coated with a layer of fluorocarbon polymer which is then laminated onto the sheet by a hot pressing operation. Despite this invention, there is still a need for a preservative package having a higher degree of resistance to clogging by oils and aqueous based materials.

The present invention provides a significant improvement in preservative packages of this type insofar as it enables the fabrication of food preservative packages which actually repel water and oil. Preservative packages made in accordance with the present invention exhibit a porous structure having an actual conformal coating of a fluoroacrylate based polymer thereupon and because of this, they are not coated or clogged by oils or other liquids and hence retain a high level of activity. These and other advantages of the present invention will be readily apparent from the drawings, discussion and description which follow.

BRIEF DESCRIPTION OF THE INVENTION

There is disclosed herein a gas permeable package for retaining a preservative agent. The package is fabricated from a material which includes a porous substrate member having pores sufficiently large to permit passage of gases therethrough but small enough to retain the preservative agent. The package further includes a conformal, hydrophobic and oleophobic coating disposed upon the porous support member. The coating includes a polymer of a fluoroacrylate monomer having the formula $(C_nF_{2n+1})(CH_2)_x(CHR)OCOCH=CH_2$ wherein: n is an integer, x is 0, 1, 2 or 3 and R is H or $CH_2 OCOCH=CH_2$. The coating repels oil and water while permitting the passage of gases therethrough.

In particular embodiments, the support member comprises a porous membrane. In other embodiments, the porous support member may comprise paper or fabric. Generally, the pores in the support member are within the range of 0.01 to 100 microns, although in some instancs they may be as large as 0.5 millimeter. The package may further include a secondary support member which is also permeable to gases and which retains the porous member and conformal coating thereupon. The preservative agent retained within the package may comprise a desiccant, an oxygen scavenger, an odor absorber, a carbon dioxide absorber or combinations thereof.

DETAILED DESCRIPTION OF THE INVENTION

Figure 1:
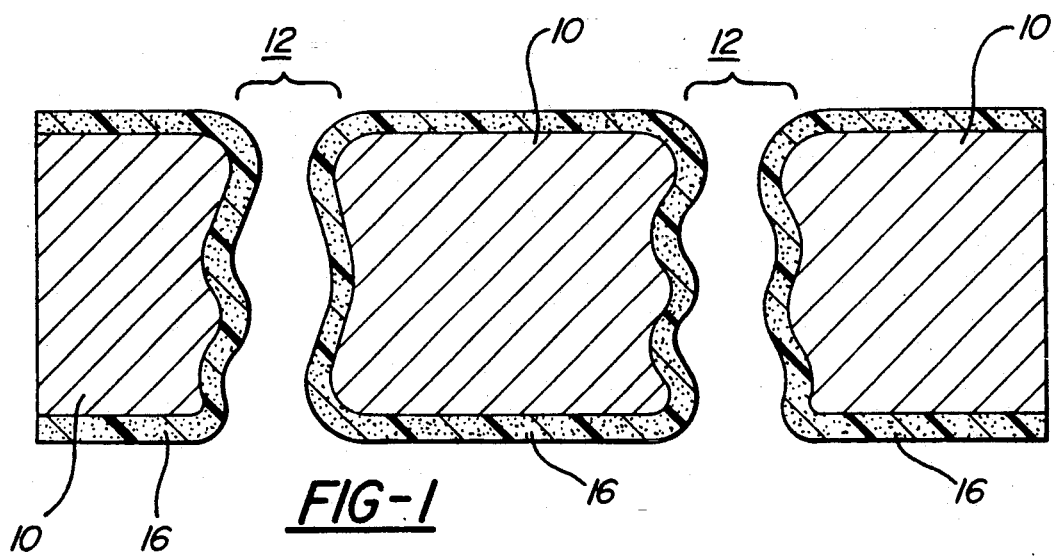
FIG. 1 is a cross-sectional view of a portion of a packet structured in accord with the principles of the present invention.

The present invention is directed to a package for containing a preservative agent. The package is sufficiently porous to allow atmospheric gases to pass therethrough and contact the agent; the package is also repellent to both water and oil so as to prevent clogging of the pores by such materials. Specifically, the package comprises a porous substrate having a conformal coating of a particular class of fluoroacrylate based polymers thereupon. As used within the context of the this application a "conformal coating" is a coating which follows the general topology of the porous support substrate, although it is to be understood that the coating can vary somewhat in thickness and need not reproduce the adjacent substrate geometry precisely provided it does not significantly occlude the pores. In general, the conformal coating covers at least the exterior portion of the package and extends through a significant portion of the pores thereof so as to repel water and oils from the pores. The conformal nature of the coating operates to create a mechanical interlock of the coating to the substrate so as to prevent separation of the coating and loss of repellency characteristics.

The Polymers

The fluoroacrylate coating comprises a polymer prepared from at least a fluoroacrylate monomer of the general formula $(C_nF_{2n+1})(CH_2)_x(CHR)OCOCH=CH_2$ wherein: n is an integer, x is 0, 1, 2 or 3 and R is H or $CH_2 OCOCH=CH_2$. In the most preferred embodiments, n has a value of at least 8 and is most preferably 8, 10 or 12. In many instances, the fluoroacrylate monomer is comprised of a mixture of homologues corresponding to different values of n. It has been found that for superior results at least 5% of the homologues should have a value of n which is 8 or more and most preferably at least 30% of the homologues should have a value of at least n which is 8 or more. Ideally 50% of the homologues should have a value of n which is 8 or more.

Monomers of this type may be readily synthesized by one or skill in the chemical arts by applying well known chemical techniques. Additionally, many of these materials are commercially available. The DuPont Corporation sells a group of fluoroacrylate monomers under the trade name Zonyl ®. These materials are available with different distributions of homologues. Those Zonyl ® materials sold under the designation "TA-N" have particular utility in the practice of the present invention.

Polymers based upon this class of fluoroacrylate monomers have heretofore been utilized in the preparation of filter media and soil and water repellant fabrics. Disclosure of polymer materials of this type as well as their preparation for the aforementioned uses is found in U.S. patent application Ser. No. 544,263 filed Jul. 18, 1990, the disclosure of which is incorporated herein by reference. Fluoroacrylate based polymers of this type have not been employed heretofore in connection with the packaging of food preservative materials and the present invention recognizes the fact that use of these materials as packaging for food preservatives confers significant insofar as the packages are not clogged by oils, greases or other liquids in the food products.

The Support Member

The porous support substrate of the present invention may comprise any one of a variety of materials. The substrate must be sturdy enough to contain the preservative agent and must be porous enough to permit passage of ambient atmospheric gases therethrough but it must be of a sufficiently fine porosity to retain the preservative agent therein. Clearly, the range of pore sizes will depend upon the nature of the preservative agent itself. A relatively coarse material such as silica gel may be packaged in a very large pore size material, for example a material having a pore size of up to 0.5 millimeters. Many other preservative agents, such as oxygen scavenging agents are of finer particle size and require a smaller pore size packaging material. Typically one having a pore size in the range of 0.01-100 microns.

The support member may comprise a porous material such as paper and woven or non-woven fabrics. One particular non-woven fabric which may be employed is a spun-bonded polyester sold by the Eaton-Dikeman Corporation under the designation Hollytex. The support may also comprise a perforated sheet of polymeric material.

The support member may also comprise a microporous membrane. One particularly preferred membrane is the Sunbeam Process ™ material of Gelman Sciences, Inc. which is a copolymer of urethane and acrylic monomers and is disclosed in U.S. Pat. No. 4,466,931, the disclosure of which is incorporated herein by reference. Another membrane is an acrylate microporous membrane sold by Gelman Sciences, Inc. under the Versapor ® designation. Still another type of microporous substrate is a porous polytetrafluoroethylene membrane manufactured by W. L. Gore and Associates. Other membranes which may be employed in conjunction with the present invention are polyamide, PVDF, polyolefin and polyurethane microporous membranes such as those sold by Millipore, Pall, F.M. Cuno, 3-M and others.

Cross-Linkers and Co-Monomers

In addition to the aforementioned fluoroacrylate monomer, cross linking agents or other co-monomers may be included in the coating without compromising the efficiency thereof. The cross linking reagents, as is well known to those of skill in the art, react to further cross link the polymer chain at various points to thereby further decrease its solvent solubility and enhance its mechanical bond to the porous substrate.

There are a wide variety of cross linking agents for acrylate type polymers known to those of skill in the art. One particularly preferred group of cross linking agents comprises the acrylates, particularly mono, di, tri and poly-acrylates which are compatible (i.e., at least partially soluble) with the fluoroacrylate monomer in a particular carrier solvent solution. Polyacrylamides also have significant utility as cross linkers.

Two particularly preferred cross linking agents are trimethylolpropanetriacrylate (TMPTA) and hexanedioldiacrylate (HDDA). Cross linking agents are typically included in amounts by weight of up to 80% of the monomer mixture and more generally up to 50% of the monomer mixture. Most typically they are employed in the range of 5-30 weight percent of the fluoroacrylate monomer.

Coating the Support Member

The porous support substrate is most advantageously coated with the fluoroacrylate based polymer by an in situo polymerization process. In this process, the monomer, together with any cross linking agent or co-monomer, is dissolved in a solvent and applied to the porous support substrate. The solvent is at least partially removed by evaporation leaving a monomer coating on the substrate and this coating is subsequently polymerized to form a conformal, adherent polymer layer. The amount of monomer remaining after evaporation of the solvent preferably comprises 0.1-10 percent by weight of the coated support membrane although other amounts may be similarly employed.

Polymerization may be initiated by radiation such as ultraviolet or visible radiation as is well known to those of skill in the art. Ultraviolet radiation may be sufficiently energetic to directly initiate polymerization of the monomers; however, in some instances, particularly when lower energy ultraviolet radiation or visible radiation is employed, a photoinitiator is advantageously included in the monomer solution. Photoinitiators are well known to those of skill in the polymer arts and some preferred photoinitiators include bezyl dimethyl ketal (BDK), one grade of which is sold under the designation KBI by the Sartomer Corporation. Other photoinitiators comprise benzophenone derivatives and include those sold under the trade names "Irgacure 184" by Ciba Geigy and "Darocur 1173" by the Merck Corporation.

In other instances, polymerization of the fluoroacrylate monomers may be initiated by bombarding them with an electron beam in which case an initiator compound is generally not employed. In yet other instances, polymerization may be by a thermally initiated route in which instance free radical initiators such as benzoyl peroxide are added to the mixture and activation occurs when the mixture is heated. Techniques for in situo polymerization are detailed in the aforementioned patent application incorporated herein by reference. In general, it is desirable to carry out the polymerization in a low oxygen atmosphere (less than 200 ppm).

The monomer, together with any cross linker and initiator, is dissolved in a solvent and coated onto the substrate by dipping, spraying, roller coating or any other such technique and the solvent is at least partially removed by evaporation prior to polymerization. There are a wide variety of solvents which may be used in this process. The primary criteria are that the solvent not interfere with the polymerization or degrade the support substrate. Ideally, the solvent should be fairly volatile to facilitate its removal. Fluorocarbon liquids, such as those sold by the DuPont Corporation under the designation "Freon" ®, particularly "Freon 113" ® are good solvents. Other solvents include chloroform, perchlorotheylene, methylene chloride, acetone, hydrocarbons, ethers and the like.

In some instances, the monomer may be prepolymerized and subsequently coating onto the substrate by solvent coating processes well known to those of skill in the art. In such instance the fluoroacrylate monomer, together with any initiators, cross linkers or co-monomers is polymerized by ultraviolet or visible radiation, electron beam or free radical techniques, as mentioned herein above, to produce a polymeric material. This material is then dissolved in a solvent (if not already polymerized in a solvent) and coated onto the substrate. Although it has been found that such solvent coating processes tend to close the pores of the substrate, such techniques are quite acceptable in the instance where large pore size substrates, typically 100 microns or greater, are employed.

The Package

A material thus prepared may be readily fabricated into a package for containing a preservative agent by utilizing standard packaging techniques. For example, the material may be laminated or adhesively bonded to form a packet. In some instances, it will be advantageous to include a secondary support member in conjunction with the aforementioned conformally coated porous member. The secondary support member adds additional support to the package and may assist in heat sealing for laminating operations. Obviously, the secondary support material must be permeable to the ambient atmosphere and should be placed on the side of the package which will not contact the food environment so as to avoid the problem of clogging by oils greases or other liquids. Secondary support materials may comprise polymers such as polyethylene, polyvinylidine fluoride and the like. In general, these polymers are fairly permeable to oxygen and other atmospheric gases; although, permeability may be greatly enhanced by perforation. Other secondary support materials may also comprise paper, and woven or non-woven fabrics.

Referring now to FIG. 1, there is shown an enlarged view of a fragment of a package structured in accord with the principles of the present invention. Shown in the figure is a support member 10 which includes pores 12 therein and a conformal, hydrophobic and oleophobic coating 16 disposed thereupon. It will be noted from the figure that the coating 16, in this illustrated embodiment, extends throughout the pores 12 of the support member 10. It has been found that the coating 16 need not extend completely through the pores in order to secure the advantages of the present invention. It is sufficient that the coating 16 be disposed upon the side of the package material which will encounter the grease or aqueous materials and that the coating extend at least part way into the pores and preferably at least half way through the pores to prevent clogging thereof by oil and grease. As noted hereinabove, the coating 16 repels both aqueous and oily contaminants and prevents them from entering the pores 12.

Figure 2:
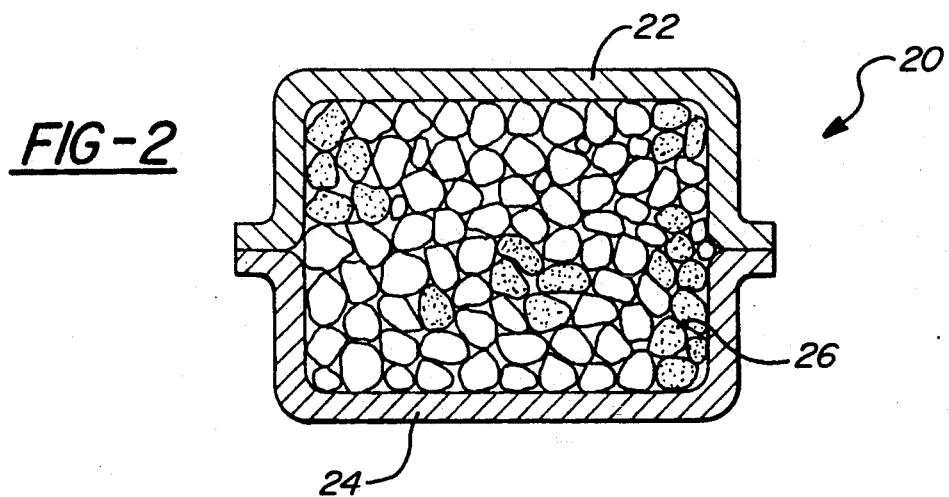
FIG. 2 is a cross-sectional view of a first embodiment of a packet structured in accord with the principles of the present invention.

Referring now to FIG. 2, there is shown a cross-sectional view of a package 20 structured in accord with the principles of the present invention. The package comprises two sheets of material affixed along their edges so as to define an interior volume for enclosing a preservative material 26. The sheets 22,24 are generally similar to the coated support member depicted in cross section in FIG. 1.

Figure 3:
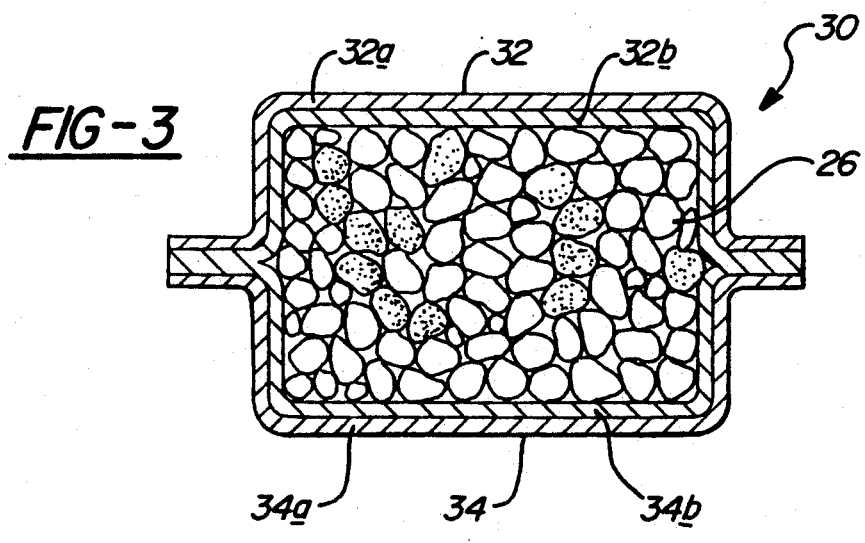
FIG. 3 is a cross-sectional view of a second embodiment of a packet structured in accord with the principles of the present invention and illustrating the use of a secondary support member.

Referring now to FIG. 3, there is shown yet another package 30 structured in accord with the principles of the present invention. The package 30 includes two sheets 32,34 which are joined along their common edges to enclose a volume of preservative material 26 therebetween. The sheets 32,34 of the FIG. 3 embodiment differ from those of the FIG. 2 embodiment insofar as they are a two-layered structure comprised of a first layer 32a,34a which is generally similar to the aforedescribed coated support member depicted in FIG. 1 and a secondary support member 32b,34b disposed toward the interior of the package 30.

The secondary support member 32b,34b functions to support the coated layer 32a,34a and provide additional mechanical support thereto. It is obviously important that the secondary support layer be permeable to ambient gases so as to preclude interference with the function of the preservative package. The secondary support member is not in direct contact with the exterior environment of the packet and hence need not be hydrophobic or oleophobic. The secondary support member may be fabricated from paper, woven or non-woven fabric, polymeric material or any similar permeable material. If a polymeric material is used to fabricate the support member it should be permeable to the relevant species; for example, if the preservative agent is an oxygen scavenger. The polymer should be polyethylene, PVDF or another oxygen permeable material. Alternatively, the polymeric member may be perforated.

In the illustrated embodiment, the secondary support layers 32b,34b are fabricated from a thermoplastic material and fabrication of the packet 30 is accomplished by heat sealing the two-layers 32b,34b together to provide a tight seal.

The preservative agents employed in connection with the package of the present invention are not limited to any one group of materials. They may comprise oxygen scavengers such as the aforementioned iron compounds as well as activated charcoal or other such odor absorbents. The package may be employed to contain a desiccant agent such as silica gel or calcium chloride or a carbon dioxide absorbent such as ascarite. In other instances, the package may include a biocide or deodorant material. While described primarily with reference to a package for a food preservative material the present invention will also find significant utility in packaging preservative materials for other applications. For example, it is frequently desirable to include a desiccant and/or an oxygen scavenger in containers for tools or other ferrous articles. Prior to being placed in the container, these articles are frequently coated with oil or grease which can clog a preservative packet. Clearly, the present invention has utility in such applications.

In view of the foregoing, it is understood that the present invention may be applied to a wide variety of situations wherein oil, grease and water-proof porous packages are required for a variety of materials. Therefore, the foregoing drawings, discussion and description are merely meant to be illustrative of particular embodiments of the present invention and are not meant to be limitations upon the practice thereof. It is the following claims, including all equivalents that define the scope of the invention.

We claim:

1. A gas-permeable package for retaining a preservative agent, said package fabricated from a material including:
   a porous support member having pores sufficiently large to permit passage of gases therethrough, but small enough to retain said preservative agent; and,
   a conformal, hydrophobic and oleophobic coating disposed upon said porous support member, said coating including a polymer of a fluoroacrylate monomer of the formula: $(C_nF_{2n+1})$ $(CH_2)_x$ $(CHR)OCOCH=CH_2$ wherein: n is an integer, x is: 0,1,2 or 3 and R is: H or $CH_2OCOCH=CH_2$, whereby said coating repels oil and water while permitting passage of gases therethrough.

2. A package as in claim 1, wherein said porous support member comprises a porous membrane.

3. A package as in claim 2, wherein said porous membrane includes a material selected from the group consisting essentially of polytetrafluoroethylene, vinyl, polyamide, polyurethane, polyvinylidene fluoride, polypropylene, polyethylene, polysulfone, poly(ethersulfone) and combinations thereof.

4. A package as in claim 1, wherein said porous support member is paper.

5. A package as in claim 1, wherein said porous support member is fabric.

6. A package as in claim 1, wherein said porous support member includes pores in the range of 0.01 to 100 microns.

7. A package as in claim 1, further including a secondary support member fabricated from a material permeable to gases, the porous member and conformal coating thereupon being supported by said secondary support member.

8. A package as in claim 7, wherein said secondary support member comprises a sheet of material selected from the group consisting essentially of paper, fabric, porous polymers and combinations thereof.

9. A package as in claim 1, further including a preservative agent retained therein, said preservative agent selected from the group consisting essentially of: dessicants, oxygen scavengers, odor absorbers, carbon dioxide absorbers, biocides and combinations thereof.

10. A package as in claim 1, wherein said monomer comprises a number of homologues corresponding to different values of n and wherein at least 5% of said homologues have a value of n which is at least 8.

11. A package as in claim 10, wherein at least 30% of said homologues have a value of n which is at least 8.

12. A package as in claim 10, wherein at least 50% of said homologues have a value of n which is at least 8.

13. A package as in claim 1, wherein said conformal coating includes a polymer of said fluoroacrylate monomer and a cross linking reagent.

14. A package as in claim 13, wherein said cross linking reagent is selected from the group consisting essentially of monoacrylates, diacrylates, triacrylates, polyacrylates, monoacrylamides and combinations thereof.

* * * * *